US006772122B2

(12) United States Patent
Jowitt et al.

(10) Patent No.: US 6,772,122 B2
(45) Date of Patent: Aug. 3, 2004

(54) CHARACTER ANIMATION

(75) Inventors: Jonathan Simon Jowitt, Bristol (GB);
William James Cooper, Bristol (GB);
Andrew Robert Burgess, Bristol (GB)

(73) Assignee: Ananova Limited, Bristol (GB)

( * ) Notice: Subject to any disclaimer, the term of this patent is extended or adjusted under 35 U.S.C. 154(b) by 0 days.

(21) Appl. No.: 10/257,046

(22) PCT Filed: Apr. 6, 2001

(86) PCT No.: PCT/GB01/01579
§ 371 (c)(1),
(2), (4) Date: Feb. 11, 2003

(87) PCT Pub. No.: WO01/78067
PCT Pub. Date: Oct. 18, 2001

(65) Prior Publication Data
US 2003/0149569 A1 Aug. 7, 2003

(30) Foreign Application Priority Data
Apr. 6, 2000 (GB) ................................................ 000853

(51) Int. Cl.[7] .............................................. G10L 21/00
(52) U.S. Cl. ..................................... 704/270; 704/235
(58) Field of Search ............................... 704/235, 270, 704/276

(56) References Cited
U.S. PATENT DOCUMENTS 5,657,426 A * 8/1997 Waters et al. ............... 704/276
5,734,794 A   3/1998 White
5,878,396 A * 3/1999 Henton ........................ 704/276
5,880,788 A * 3/1999 Bregler ........................ 704/235
6,366,885 B1 * 4/2002 Basu et al. ................... 704/270
6,449,595 B1 * 9/2002 Arslan et al. ................ 704/235

FOREIGN PATENT DOCUMENTS

GB    2 328 849 A    3/1999
WO   WO 97 36288 A   10/1997

OTHER PUBLICATIONS

Taylor et al., "SSML: A speech synthesis markup language," *Speech Communication*, NL, Elsevier, Science Publishers, Amsterdam, vol. 21, No. 1, Feb. 1, 1997; pp. 123–133.

Nack et al, "Everything you wanted to know about MPEG–7: Pat 2" *IEEE MULTIMEDIA*, IEEE Computer Society, US, vol. 6, No. 4, Oct. 1999, pp. 64–73.

* cited by examiner

Primary Examiner—David D. Knepper
(74) Attorney, Agent, or Firm—Sughrue Mion, PLLC

(57) ABSTRACT

The present invention provides a method and apparatus for generating an animated character representation. This is achieved by using marked-up data including both content data and presentation data. The system then uses this information to generate phoneme and viseme data representing the speech to be presented by the character. By providing the presentation data this ensures that at least some variation in character appearance will automatically occur beyond that of the visemes required to make the character appear to speak. This contributes to the character having a far more lifelike appearance.

41 Claims, 2 Drawing Sheets

CHARACTER ANIMATION

FIELD OF THE INVENTION

The present invention relates to a method of generating an animated character representation using a processing system and apparatus for generating an animated character representation. In particular, the present invention relates to a system that uses input data, comprising content data and presentation data, to animate a character representative of a person, such as a news reader, announcer, presenter, or the like.

BACKGROUND TO THE INVENTION

Character animation has previously been achieved in a number of ways. The most basic system is standard hand drawn animation, achieved by drawing a number of sequential frames and then displaying the frames at a high rate to generate the appearance of character movement. However, the production of such frames is time consuming and requires great skill in producing the desired appearance.

More recently, character animation has been achieved using computer-based systems. However, in systems like this, again the animation is predetermined by an artist, requiring great skill and work to produce the desired appearance.

Automated character animation has also been produced which operates by converting a standard text file into speech and then using visemes to animate a character. However, these systems suffer from the drawback that the range of movement presented by the character is limited and in particular is normally limited to the movement required to present the visemes. Any additional character movement must be added in manually at a later date and cannot be incorporated automatically. Furthermore, the characters can only demonstrate a very limited linear response to the text. Accordingly, each time the character reads the text the appearance of the character is identical. An example of such a system is described in U.S. Pat. No. 5,657,426.

This therefore does not present a very human appearance in which the specific movement of the character would vary each time the text is read out. Furthermore, when no text is being read the character is motionless, again contributing to the lack of human appeal or characterization of the character.

SUMMARY OF THE INVENTION

In accordance with a first aspect of the present invention, we provide an apparatus for generating an animated character representation, the apparatus comprising a processing system having:
  an input for receiving marked-up input data including:
    i content data representing speech to be presented; and,
    ii presentation data representing the manner in which the speech is presented;
  a processor coupled to the input for generating data according to a defined time-base, the data including:
    i phoneme data generated in accordance with the content data; and,
    ii viseme data generated in accordance with the phoneme data and the presentation data;
  the processor being further adapted to:
    iii generate audio data in accordance with the phoneme data;
    iv generate image data in accordance with the viseme data; and,
    v synchronise the output of the audio and image data in accordance with the defined time-base.

In accordance with a second aspect of the present invention, we provide a method of generating an animated character representation using a processing system, the method comprising:
  receiving marked-up input data including:
    i content data representing speech to be presented; and,
    ii presentation data representing the manner in which the speech is presented;
  generating data according to a defined time-base, the data including:
    i phoneme data generated in accordance with the content data; and,
    ii viseme data generated in accordance with the content data;
  generating audio data in accordance with the phoneme data;
  generating image data in accordance with the viseme data and the presentation data; and,
  synchronising the output of the audio and image data in accordance with the defined time-base.

The present invention provides a method and apparatus for generating an animated character representation. This is achieved by using marked-up data including both content data and presentation data. The system then uses this information to generate phoneme and viseme data representing the speech to be presented by the character. By providing the presentation data this ensures that at least some variation in character appearance will automatically occur beyond that of the visemes required to make the character appear to speak. This contributes to the character having a far more lifelike appearance.

The marked-up data input to the system may be manually entered, for instance by typing text at a terminal, or may be derived from a data source. This allows the system to be used for the automated presentation of information from news and data sources and the like.

The processor usually includes:
  a text-to-speech processor for generating the phoneme data and the audio data;
  an animation processor for generating the viseme data and the image data; and,
  a parser for:
    parsing the received marked-up data;
    detecting predetermined content data which is to be presented in a predetermined manner;
    generating presentation data representative of the predetermined manner; and,
    modifying the received marked-up data with the generated presentation data.

The use of specialised text-to-speech and animation processors allows the system to generate the audio and image data in real time, thereby speeding up the character animation process. The audio and image data can be generated at the same time or at different times, and/or in different locations, as required. It will be appreciated, that the text-to-speech and animation processors may be implemented as software within a single processor, or may alternatively be implemented as separate hardware components.

Parsing the received marked-up data allows presentation data to be added, which in turn allows data which has only minimal or no mark-up to be processed by the present invention. This also allows predetermined content to be represented in a predetermined manner. Furthermore, this allows the animated character to stress certain words, such as numbers, names, nouns and negatives, although this is not essential to the present invention.

The processing system will usually include a store for storing data, the parser being coupled to the store to obtain an indication of the predetermined content data therefrom. This allows information concerning the mark-up to be added to be stored centrally so that it can be accessed directly by the parser. Alternatively, the information may be obtained via a communications system, such as a LAN (Local Area Network) or the like, from a remote store.

Typically the apparatus includes a linguistic processor adapted to:

parse the content data;

determine the phonemes required to represent the content data; and, generate phoneme time references for each of the phonemes, the phoneme time reference indicating the time at which the respective phoneme should be presented with respect to the time base.

It is preferable to use phonemes to generate the audio data to be presented by the animated character as this allows a small number of elemental sound units to represent the majority of sounds that would need to be made by the character to present the speech. Additionally, processing systems for determining phonemes from text are well known and readily implementable.

Furthermore, the generation of the phoneme time references allows the temporal location of each of the phonemes to be maintained as well as enabling the synchronization of remaining steps in the procedure.

Typically the linguistic processor is further adapted to:

parse the presentation data;

generate a number of tags representing the presentation data; and, generate tag time references for each of the tags, the tag time reference indicating the time at which the respective tag should modify the manner of presentation with respect to the time base.

The use of tag time references allows the temporal position of the presentation data to be maintained relative to the phoneme data. Alternatively, other synchronisation techniques, could be used.

Usually the linguistic processor is coupled to the store to obtain an indication of the phonemes required to represent respective words. In this case, the indication is usually in the form of a set of rules specifying how the phonemes should be determined from the text. A dictionary can also be provided for exceptions that do not fit within these more general rules. This provides a simple technique for obtaining the phonemes based on the received data. However, any technique used in the art could be employed.

The text-to-speech processor preferably includes a concatenation processor adapted to:

determine phoneme data representing each of the phonemes; and, concatenate the phoneme data in accordance with the phoneme time references to generate audio data representing the speech.

The use of a specialised concatenation processor ensures that the phoneme data, which is usually obtained from the store, can be readily combined to form the required audio data.

Furthermore, the concatenation processor is also adapted to modify the audio or phoneme data in accordance with the presentation data. This allows the audible voice of the character to be controlled in conjunction with the character's appearance. Thus, for example, a different tone, pitch and speed of speech can be used depending on whether the character is supposed to be happy, sad, serious or the like. Alternatively however, the audible voice may remain unchanged irrespective of the character appearance. A further alternative is for separate voice modifications to be specified in the data file, independent of the presentation data.

The animation processor preferably includes a phoneme processor adapted to:

obtain the determined phonemes, and the associated phoneme time references, from the linguistic processor;

determine visemes corresponding to each of the determined phonemes; and, determine a viseme time reference for each viseme in accordance with the phoneme time reference of the corresponding phoneme.

As there are only a limited number (approximately 48) phonemes and a limited number (approximately 20) visemes, it is relatively easy to convert each phoneme into a corresponding viseme. In this case, using viseme time references corresponding to the phoneme time references advantageously ensures the synchronisation of the visemes with the phonemes. This in turn ensures that lip motion is synchronized with the production of sound to achieve lip sync.

The animation processor usually also includes a viseme processor coupled to the store, the viseme processor being adapted to obtain viseme data from the store in accordance with the determined visemes, the viseme data including a number of parameters representing the variation required from a base character image to represent the respective viseme. The use of data representing the variation from a base face, allows a wide range of facial configurations to be implemented without requiring the amount of processing power required to generate the representation from scratch for each face. This helps speed up the processing time allowing the image data to be generated in real time as the content data is "read" by the character.

Preferably, the animation processor includes at least one modification processor adapted to modify the viseme data in accordance with the presentation data. By modifying the viseme data, this helps vary the appearance of the character to make the character appear more lifelike. This is typically achieved by modifying the parameters of the viseme data in accordance with modification data obtained from the store.

The animation processor usually includes at least one modification processor adapted to modify at least one of a specified expression, behaviour, and action. This allows different aspects of the characters appearance to be altered.

Preferably, a respective processoris implemented for modifying the behaviour, expression and actions separately. This allows more general appearances such as overall head movements to be controlled separately to specific appearances such as smiling, frowning or the like. Thus, the general appearance may be sad in which case the character may look generally upset with a down-turned mouth, or the like. A specific appearance however may be a laugh or smile and thus, even though the character has the overall appearance of being sad, this still allows a smile to be generated. Accordingly, this allows for detailed modification of the characters appearance as required thereby aiding the generation of a realistic image.

Achieving this by progressively modifying the parameters of the viseme data allows the action, expression and behaviour modifications to be implemented without undue complications. Alternatively however, separate image sequences representing the visemes, the expressions, the actions and the behaviours could be generated and then combined at a later stage.

Typically the or each modification processor is further adapted to modify the viseme data in accordance with pseudo-random data. This allows random head movement, or facial appearances to be included in the system thereby ensuring that the character animation would be non-identical even if based on the same input data file for any two successive animations. This helps reduce the repeating of certain word, phrase, appearance combinations, thereby helping to add to the naturalistic appearance of the animated character.

The animation processor further usually includes an interpolation processor for interpolating the viseme data to determine the appearance of the character at times between the specified visemes. This allows a continuous sequence of images to be generated.

A render processor is coupled to the interpolation processor for generating image data in accordance with the interpolated viseme data, the image data representing the character presenting the speech defined by the content data. In particular, if the processing system further includes an video processor, the render processor may form part of the video processor. This allows the image data to be rendered in real time without using up the resources of the main processor, thereby helping implement the invention in real time. The render processor may alternatively be implemented as software within the main processor itself, if sufficient resources are available.

Typically the video processor also generates video data representing the animated character sequence. This advantageously allows the animated character to be displayed either as image data or as video data allowing it to be displayed on a wide range of different display devices.

Optionally the system can further include a communications network interface, which in use couples the computing device to a communications network, thereby allowing the animated character representation to be transferred to other processing systems coupled to the communications network.

In this case, the input can be adapted to receive marked-up data from the communications network, allowing externally generated mark-up files to be used in the generation of an animated character sequence.

Typically the data file is an XML (extensible Mark-up Language) file. This is particularly advantageous as it allows presentation data to be specified within the XML file as XML mark-up. Accordingly, the content data which is used to control the appearance of the character can be annotated with appropriate elements defining presentation characteristics which should be implemented as the respective words are spoken.

The system may be implemented on a stand alone processing system. Alternatively the system may be implemented on a communications network, such as the Internet, a local or wide area network (LAN or WAN), or the like, so that the images can be generated centrally and viewed remotely.

BRIEF DESCRIPTION OF THE DRAWINGS

An example of the present invention will now be described in detail with reference to the accompanying drawings, in which.

DETAILED DESCRIPTION

Figure 1:
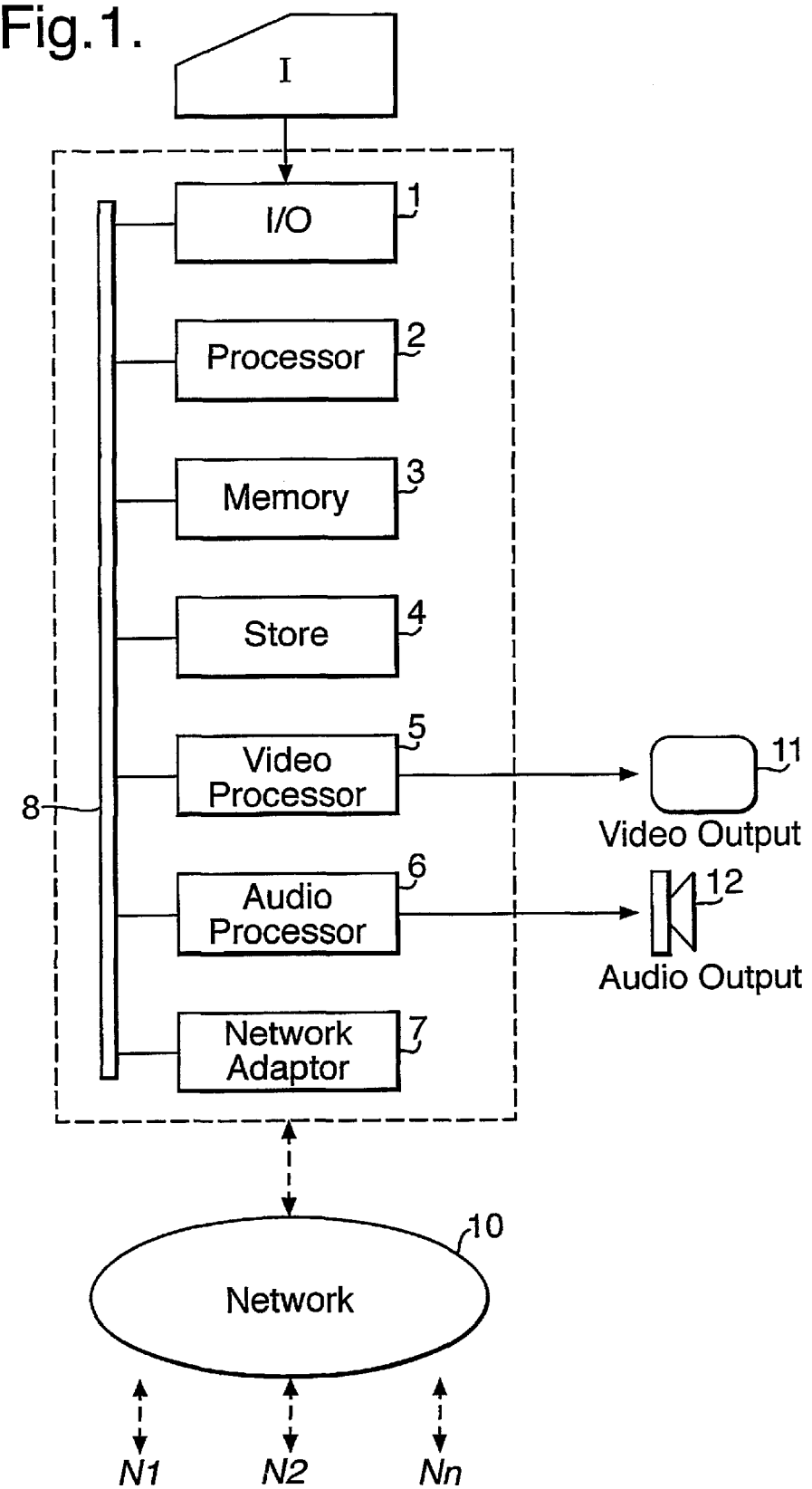
FIG. 1 is a schematic diagram of a processing system suitable for implementing the present invention; and, FIG. 2 is a schematic diagram of the software implemented on the hardware represented in FIG. 1.

FIG. 1 shows a processing system suitable for implementing the present invention. The processing system consists of a computing device formed from an input/output (I/O) device 1, a processor 2, a memory 3, a store 4, a video processor 5, an audio processor 6 and a network adapter 7, all of which are coupled together via a bus 8. The computing device may therefore be embodied in a standard personal computer, palm-top, lap-top, or the like, fitted with appropriate graphics hardware. However, dedicated hardware and software implementations are also possible. These could potentially be integrated into consumer appliances and devices.

In use, the network card 7 can be coupled to a communications network 10, to allow communications with additional end stations N1, N2 . . . Nn. The communications network can therefore be any form of network, such as a LAN, a WAN, a wireless communications network, the Internet, or the like.

Figure 2:
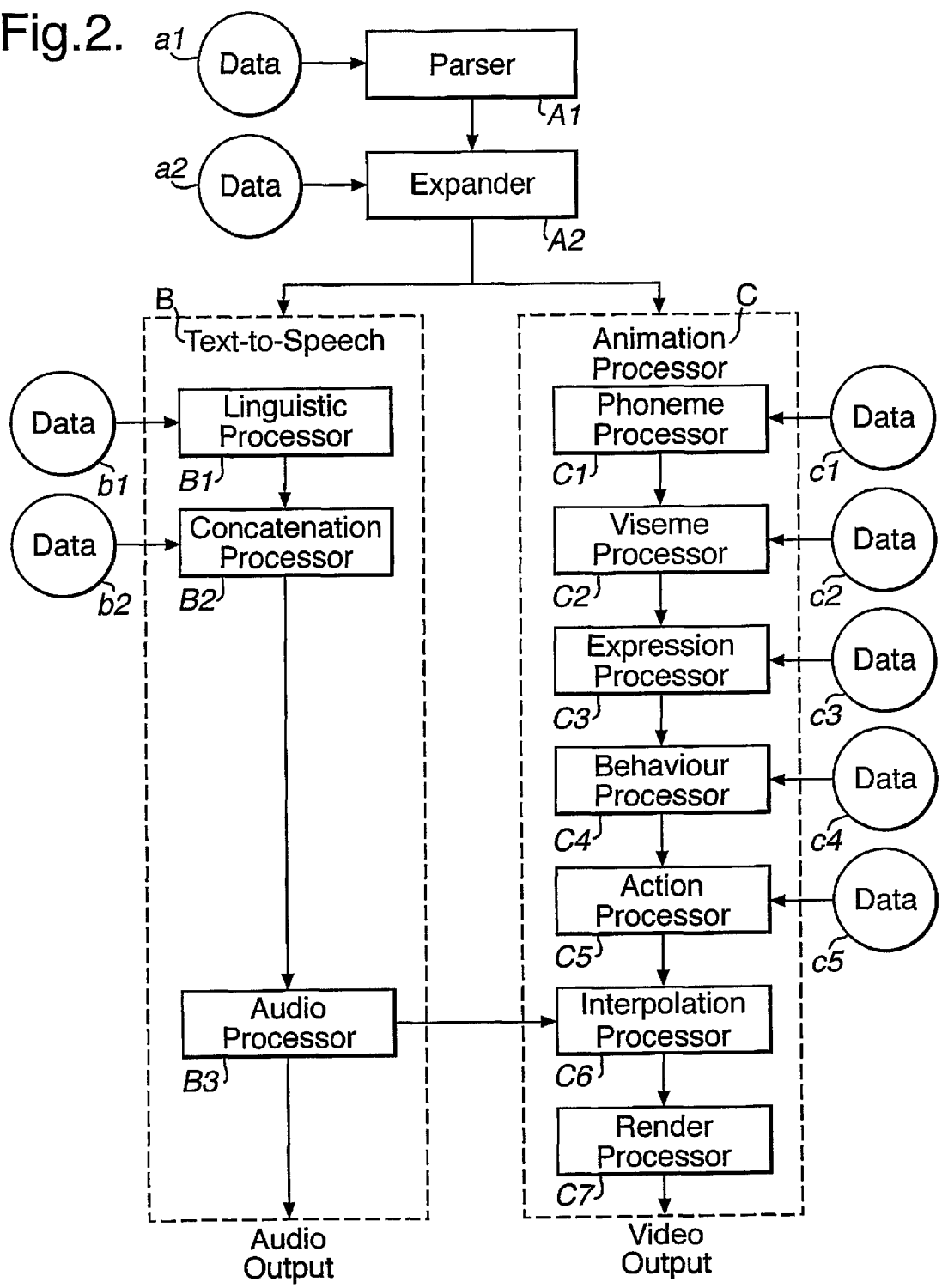

The software implemented on the processor is represented schematically in FIG. 2. As shown, marked-up input data is received by the processor 2 and transferred to a parser A1. The parser operates to parse the data and transfer the results to an expander A2, which in turn expands the data before transferring the data to a text-to-speech processor B and an animation processor C.

The text-to-speech processor B includes a linguistic processor B1, a concatenation processor B2 and an audio processor B3, as shown.

The animation processor C includes a phoneme processor C1, a viseme processor C2, an expression processor C3, a behavior processor C4, an action processor C5, an interpolation processor C6 and a render processor C7 coupled together in sequence, as shown. The text-to-speech processor B and the animation processor C operate to generate audio and image output data respectively which are then output from the processor 2.

The parser, the expander and the processors are able to obtain respective data as shown in FIG. 2. This input data is used during the generation of the animated character, as will be explained in more detail below. The input data may be entered directly, for instance at a keyboard, obtained from a local file in the store 4, or a remote source via the network 10.

Operation of the system shown in FIGS. 1 and 2 will now be described.

In use, the processor 2 uses marked-up data to generate an animated character representation. The marked-up data may either be received at the I/O device 1, as represented at 1, or alternatively the marked-up data may be received from the network 10, via the network adapter 7. Additionally, of course, the marked-up data may be stored in the store 4. The marked-up data can then be transferred to the processor 2 via the bus 8.

The marked-up data is typically supplied to the processor 2 in the form of an XML file which includes content data representing the words that are to be spoken by the character, together with presentation data representing the manner in which the speech is presented. In this case, the content data is usually in the form of text corresponding to the words to be spoken, although numerical or other notations may be used.

In contrast, the presentation data may include several different forms. The main form of presentation data uses predefined elements or tags to mark-up the content data to be spoken by the animated character. Thus, in this case, the XML tags are used to modify the manner in which the text they span is presented.

In addition to this, certain character sequences and certain words can also acts as mark-up data. Thus, for example, the presence of three period characters may cause the character to pause before moving on to the next word represented by the content data.

The presentation data generally include elements relating to, but not limited to, context, tone, emotion, expression, actions, or other presentational events. In addition to this however, the presentation data may specify other elements of the presentation, such as audio-visual production.

Thus, for example, presentation parameters may be defined which are persistent and pertain to the duration of the presentation. For instance, the output image dimensions may be specified as a presentation parameter. Alternatively, presentation events may be used which correspond to a temporal cue that takes place at a time relative to its position in the content data. For instance, a change in the view of the virtual camera may be included as a presentation event.

Accordingly, the input data may be regarded as a form of script, which contains content and associated cues to allow the production of an animated presentation.

This input data may be entered manually, be derived from a data source, or be obtained a combination of manual and automated input. Similarly, the mark-up may be manually applied, or generated by an external system.

The actual mark-up protocol used will vary depending on the specific implementation of the invention. However, an example of the mark-up scheme used by the current implementation is shown in Appendix A, together with an example script of news stories to be read out. The example shown specifies various actions and behavioral aspects of the animated character. However, these specifications are not concrete but rather indicate a general character behavior which is then implemented by the processor 2.

As shown in this example, the XML tags are used to specify various actions, events and emotions, which the character is to perform when reading out the associated text. In this example, the associated text is the text surrounded by the given tag. Thus, in the example in Appendix A, the phrase "American Beauty also received awards for best actor, screenplay and cinematography" would be presented in a happy manner due to the presence of the emotion tag "happiness".

In use, as mentioned above, the XML file is received by the parser, which operates to parse the XML data. The parser uses configuration data a1 to interpret the contents of the XML file and to provide configuration defaults.

This allows default presentation data to be added in to the file, as appropriate. This may include for example, an indication of the location to which the animated character representation is to be output or the required format of the output. More complicated presentation data relating to the actual animation of the character may also be added.

Thus, for example, it is usually desirable to place a greater emphasis on certain words as they are presented by the character. In particular, words such as names, nouns, negatives and numbers are typically stressed as they are normally of greater importance than other words in the text. The parser will therefore be adapted to detect these words and then add in appropriate presentation data causing the words to be stressed as they are presented.

In addition to this, if the file contains little or no presentation data, the parser is able to add in rudimentary presentation data in accordance with the configuration data. This ensures that even if the received file does not include any presentation mark-up, the animated character will still demonstrate at least some default characteristics.

The content and presentation data are then transferred to the expander which can make various substitutions and expansions, to the data as required. This is achieved using macro data a2, which can specify any changes which are required to the data.

Once this has been completed, the input data is translated into content data representing the text of the speech to be presented and presentation data or tags representing changes of state as they occur in the speech. Thus, the presentation data will include not only the tags originally included in the XML file, but will also include additional tags, representing presentational aspects indicated by the presence of certain characters or words.

The content data and presentation data are then transmitted to the text-to-speech processor B. Several implementations of such systems are commercially available, although all function in the same general manner.

Firstly, words to be presented are decomposed by the linguistic processor B1 into elemental sound units, or phonemes, of a given duration. As each phoneme is encountered, a time reference of the temporal location of the phoneme relative to a time base is noted.

The phonemes to be presented by the character are determined by scanning the received content data and correlating this with data from an exception dictionary b1, which indicates the phonemes required to represent the words to be spoken.

The presentation data may be used to control the manner in which the phonemes are presented. Thus, the volume, pitch and rate may be modified directly or indirectly according to the presentation data. The presentation data may also, directly or indirectly introduce a break or pause in the audio data.

Thus, for example, if the tone type is "fun" then the words will generally be spoken quicker than if the tone type is "serious". Accordingly, the time reference of the individual phonemes will be altered in accordance with this information.

Inflection is also provided for in the presentation data. This will often be applied to particular words such as names, nouns, negatives and numbers, which have been marked-up by the parser. The inflection given to each phoneme will again vary depending on the tone type specified. Thus, a "fun" tone type will result in more light-hearted sounding speech than the "serious" tone type.

The linguistic processor may also provide feedback data relating to linguistic features encountered in the content data, such as clause boundaries.

In addition to providing a time references for each phoneme, time references are also generated for the each of the tags and elements representing presentation data, and other feedback data.

Data representing the determined phonemes, the presentation data, any feedback data and the associated time references, are then transferred to the phoneme processor C1, in the animation processor C, as will be explained in more detail below.

An indication of the phonemes and their respective time references is transferred to the concatenation processor B2. The concatenation processor accesses phoneme data b2, representing each of the phonemes and concatenates this phoneme data to form data representing the phoneme sequence to be presented by the character.

In this implementation, the phoneme data is formed from sampled audio data together with appropriate configuration data but alternative systems can be used.

It will be appreciated, that some modification of the phoneme data may be required to ensure that all the phonemes fit together in sequence, and to ensure that all the presentational data is correctly presented.

This data is then transferred to the audio processor B3 which acts to generate audio data which, when presented by an audio playback system, corresponds to the words to be spoken by the character. The audio processor also transfers time data to the interpolation processor C6, as will be described in more detail below.

The audio data is output from the text-to-speech processor B and transferred to the output designated in the configuration data, as will be explained in more detail below.

The animation processor C operates to generate a sequence of images of the animated character. As mentioned above, data representing the determined phonemes, the presentation data, any feedback data and the associated time references, are received by the phoneme processor C1, from the linguistic processor B1.

The phoneme processor C1 uses the indication of the phonemes to determine related visemes. Typically, the number of recognisable visemes is less than the number of recognisable phonemes. Around 10–20 visemes may provide acceptable results, whereas over 40 phonemes may be required. Various phonemes may therefore result in the output of identical visemes.

Accordingly, a phoneme to viseme look-up table (LUT) may be used to specify a viseme corresponding to each phoneme. Other techniques may also be used to reduce the number of visemes required to provide acceptable results.

The phoneme processor C1 accesses the phoneme-to-viseme LUT and for each phoneme, specifies a corresponding viseme. The phoneme processor C1 therefore determines visemes with time references corresponding to each phoneme in the generated phoneme sequence.

An indication of the visemes to be used is transferred to the viseme processor C2. The viseme processor uses this information to access viseme data c2. The viseme data, which is typically in the form of a number of parameters, defines the facial configuration of the character when the respective viseme is to be presented. This is typically defined in terms of a variation from a base facial configuration.

In addition to determining the visemes corresponding to the phonemes used to construct the words to be presented, the facial configuration may be further modified in accordance with the presentation data. This allows the character to demonstrate actions, expressions and other behavioural features defined by the presentation data.

This is achieved by using the time references of the visemes and the presentation data to determine which visemes are to be modified in accordance with which presentation data, so as to represent an appropriate expression, behaviour or action.

In order to achieve this, the viseme data is presented to the expression processor C3, the behaviour processor C4 and the action processor C5. These operate to modify respective aspects of the character's appearance to ensure that a lifelike representation of a character is generated. In each processor C3,C4,C5 the presentation data is used to access respective expression, behaviour and action morph data c3,c4,c5, which defines modifications to the appearance of the character.

The presentation data may specify absolute or relative modification of the visual appearance. Thus, relative data will typically specify a modification of parameters in the viseme data from an existing level, whereas an absolute value will set the parameter to a specified level.

Thus, an expression tag may be associated with parameters that further define the facial configuration of the character, typically defined in terms of variation from a base facial configuration.

General expressions may be specified according to proportions of basic emotions such as joy, sadness, anger, fear, disgust and surprise. Thus an expression tag for joy may, for instance, specify a variation that causes the character to appear to smile. The expression tag may specify a level as a parameter, therefore producing a smile of a certain degree.

An element of presentation data may specify multiple presentation parameters, allowing sophisticated control of the presentation using relatively sparse mark-up. Multiple expressions of differing degrees may be superimposed, allowing the creation of complex facial expressions. This allows a wide variety of facial appearances to be created. Thus, it will be appreciated that the viseme used for each sound will vary depending on the degree to which the mark-up specifies joy, sadness, or the like.

In addition to facial expressions, the presentation data may specify various behaviour, actions or gestures, which are implemented by the behaviour and action processors C4,C5. These allow facial features to be independently manipulated, for instance, raising an eyebrow or causing the character to wink. Actions and gestures, such as head and body movement, may also be initiated, as well as modifying the orientation of elements of the character, such as the angle of the head.

These actions may be specified in terms of changes with respect to time, allowing a degree of behavior or performance to be represented in the character. Actions may be explicitly invoked as a result of mark-up presentation data, produced as a result of the content data or generated automatically.

For instance, a tag to specify a wink action in the input data will cause the character to appear to wink at that point in the speech to be presented. Alternatively, the presence of a stress word, such as a negative, will cause the character to nod slightly at that point in the speech to be presented.

Various rules and strategies may be employed to modify the application of different parameters according to the current context. For example, the blink rate may increase if the current state of the character is defined as one of anger. The base character data, as modified by the viseme data, expression data, behaviour data and action data, are used to generate image data representing the character at a particular moment. Thus an expression tag for joy may, for instance, specify a variation that causes the character to appear to smile.

Expressions or actions may also be modified in accordance with the presence of one or more predetermined words, which will be identified by the parser and marked appropriately, as described above.

In addition to the variations outlined above, the expression, behaviour and action processors can implement pseudo-random behaviour. This effectively ensures that for the same input data, the appearance of the character for any two successive animations may be different, thereby increasing the apparent naturalism of the animated presentation.

This is achieved by adding in a degree of randomization into the parameters contained in the viseme sequence. The level of this random behavior is controlled within predefined levels to ensure the character remains lifelike. This ensures some degree of variation in the presentation irrespective of the input data.

For instance, a defined behaviour may specify that the character will pause and take a breath after a sentence. This behaviour may be modified on a pseudo-random basis, so that it is not applied in every instance, so that the viewer does not get a sense of the same procedures being repeated over and over again.

Characteristic behavioural features, such as involuntary blinking, may therefore be initiated periodically. Such behaviours may continue even when the character is not speaking, resulting in a more naturalistic appearance.

The combination of content data, presentation data and automatic behaviour produces a complex range of variation. The combination of effects that may be achieved from limited presentation mark-up results in a virtually indefinite number of possible visual sequences.

The presentation data, in addition to mark-up relating to the character, may specify other elements of the presentation. This includes, but is not limited to, audio-visual production parameters and events.

A presentation parameter is persistent and pertains to the duration of the presentation. For instance, the output image dimensions may be specified as a presentation parameter.

A presentation event corresponds to a temporal cue that takes place at a time relative to its position in the content data. For instance, a change in the view of the virtual camera may be included as a presentation event.

The viseme data, once modified as set out above, is then transferred to the interpolation processor C6. By virtue of the time data associated with each viseme, the state of the character may be determined with respect to time for phoneme to be presented. The interpolation processor C6 then uses the viseme data parameters to interpolate between the visemes and calculate parameters representing the visual appearance of the face positions intermediate to those defined visemes. Accordingly, this generates a sequence of parameters representative of the facial appearance of the character, which varies over time.

The interpolation is performed so that the images will be generated according to, or approximating to, a given timebase, or frame rate. By interpolating the modification of character data overtime, the state of the character may be determined for any time in the presentation.

As will be appreciated by a person skilled in the art, the interpolation is performed in accordance with time data received from the audio processor to ensure that the generated phonemes and visemes are generated at corresponding times to ensure lip sync of the character.

The interpolation processor sequences all the parameters together to generate a single animation sequence, this is transferred to the render processor C7 to generate the image sequence.

The production of images by the render processor uses standard processes and procedures customarily employed in computer animation. Thus, the representation of the character is typically stored as three-dimensional geometric data, although two-dimensional data might alternatively be used. This typically represents an abstract computer model of the character in a neutral state.

The geometric data is typically transformed mathematically according to the viseme, expression and animation data, using standard techniques conventionally employed in computer animation.

The render processor may be formed entirely from software implemented on the processor 2. However, preferably at least part of the render processor is implemented within the video processor 5. In this case, the instructions and geometry required for each image to be rendered are calculated by the processor 2 and transferred to the video processor 5 via the bus 8.

The video processor then operates to render and texture an image in real time using hardware designed for this purpose. Various graphics acceleration devices to perform this purpose are generally available, allowing the output to be generated in real-time, or greater or less than real-time according to the capabilities of the hardware, and the requirements of the particular application.

The video processor 5 typically produces image data in memory. The image data may be displayed immediately as an image, stored to a file, or transmitted over a communications network for immediate or subsequent display.

The audio data generated by the text-to-speech processor B can also be output directly from the computing device by transferring it via the audio adapter 6, to a connected speaker 12. Alternatively, the audio data can be stored in the store 4, or transferred via a network for subsequent playback.

It will be realized that in this case, the processor 2 can advantageously be adapted to combine the audio data with either the video or image data, to generate a single file containing both the animation and the accompanying audio sequence. Thus, for example, digital video files of the animated character could be produced for storage or transfer to remote locations.

It will be appreciated by a person skilled in the art that because the data can be transferred in a number of different forms, this allows the animated character to be presented on a number of different types of device. Thus, the animated character could be presented on a television or similar device. Alternatively, the animated character could be presented on the Internet, a mobile phone, personal data assistant (such as a Palm Top computer).

In this respect it will therefore be possible for remote users to request the playback of certain information such as news stories or the like. The information is used by the computing device to generate data defining the animated character representation. This data can then be transferred to the remote user allowing the remote user to display the character animation on a remote terminal, such as an end station, mobile phone, wireless terminal, or the like.

Appendix A

The following XML document provides an example of how presentation mark-up may be applied content data. This exhibit is intended simply to demonstrate the principle. In practice, different mark-up schemes might be employed, and the mark-up might be significantly richer.

```
<?xml version="1.0"?>
<script>
    <head>
        <output width="320" height="240" framerate="35"/>
        <scene src=∓[filename]"/>
    </head>
    <body>
```

-continued

```
<story type="news">
    <tone type="light">
        The Oscar for Best Picture has been awarded to
        American Beauty . . . The English theatre director,
        <img src="[filename]">
        Sam Mendes, collected the award for directing the
        movie, his feature film debut.
        </img>
        <emotion type="happiness">
        American Beauty also received awards for best
        actor, screenplay and cinematography.
        </emotion>
        <action src="[filename]"/>
    </tone>
</story>
</body>
</script>
```

The example begins with a standard declaration indicating that it is an XML document and the document itself conforms to the conventions of well-formed XML mark-up.

The <head> element of the document specifies the <output> parameters for the presentation and provides a reference to a <scene> file containing details of the scene and the character to be presented. These elements are optional and simply override any configuration defaults.

The <body> element of the document contains the remainder of the presentation and content data.

A <story> element with the attribute 'news' specifies that the included section is a news story. This information is used by the system to imply certain parameters that pertain to the presentation of news stories, as opposed to say, sports stories.

A <tone> element with the attribute 'light' indicates that the included section is light in nature, for instance, as opposed to being serious or somber. This information is used by the system to specify the general demeanor of the character during the content that the element spans.

Any content that is not included within a <tag> is to be regarded as text to be presented. Therefore the presentation will begin with words "The Oscar for Best Picture", presented in the style of a news story and will be light in tone.

Proper nouns, such as "American Beauty", whether recognised through capitalisation or linguistic parsing, may receive special stress, resulting in verbal emphasis and corresponding visual cues.

The ellipsis punctuation in the text (.) indicates that a pause is to be introduced at this point. This is an example of implicit presentation mark-up that is included in the text itself, as opposed to explicit mark-up elements.

The <img> element specifies the file location of an image to be presented at this point. In this case, the image will be shown until the closing </img> tag.

The <emotion> element here specifies an attribute of "happiness". This information is used to modify the demeanour of the character for the duration of the content spanned by the element. For instance, the character may smile to indicate an expression of happiness.

The <action> element specifies the location of a file describing an action to be performed by the character at this point. For instance, the character may look down at this point, breaking the impression of eye contact with the viewer. The action may have an implicit duration. Optionally, the intended duration of an action may be explicitly specified.

It will be seen from this simple example, that the XML input data may specify the output format, the content to be presented, and provide implicit and explicit information regarding the manner in which the content is to be presented.

An external system may provide some or all of the mark-up information to control the presentation. It is therefore not necessary to provide such information explicitly.

It may be appreciated that unlike mark-up for simple textual or graphical output, text that is spoken has an inherent duration. Therefore the presentation mark-up has chronological significance.

While, for instance, the HTML instructions for a web page typically control format, layout or typography, here the instructions have temporal value with respect to the text, by virtue of the point at which they appear, and duration implied by any text they enclose.

It may be seen that, given a suitably designed and expressive range of elements, this provides a syntactic system by which text may have mark-up imposed to deliver a presentation that is appropriate to the semantic content.

What is claimed is:

1. Apparatus for generating an animated character representation, the apparatus comprising a processing system having:
    an input for receiving marked-up input data including:
        i. content data representing speech to be presented; and,
        ii. presentation data representing the manner in which the speech is to be presented;
    a processor coupled to the input for generating data according to a defined time-base, the data including:
        i phoneme data generated in accordance with the content data; and,
        ii viseme data generated in accordance with the phoneme data and the presentation data;
    the processor being further adapted to:
        iii. generate audio data in accordance with the phoneme data;
        iv. generate image data in accordance with the viseme data and the presentation data; and,
        v. synchronise the output of the audio and image data in accordance with the defined time-base.

2. Apparatus according to claim 1, wherein the data generated by the processor, in accordance with the defined time-base, includes:
    i. first viseme data generated in accordance with the phoneme data; and,
    ii. second viseme data generated in accordance with the first viseme data modified by presentation data;
    wherein the image data is generated in accordance with the second viseme data.

3. Apparatus according to claim 1, wherein the processor includes:
    a text-to-speech processor for generating the phoneme data and the audio data;
    an animation processor for generating the viseme data and the image data; and,
    a parser for:
        i. parsing the received marked-up data;
        ii. detecting predetermined Content data which is to be presented in a predetermined manner;
        iii. generating presentation data representative of the predetermined manner; and,
        iv. modifying the received marked-up data with the generated presentation data.

4. Apparatus according to claim 3, the processing system further comprising a store for storing data, the parser being coupled to the store to obtain an indication of the predetermined content data therefrom.

5. Apparatus according to claim 4, wherein the predetermined content data includes words which are names, nouns, negatives and numbers.

6. Apparatus according to claim 3, wherein the text-to-speech processor includes a linguistic processor adapted to:
parse the content data;
determine the phonemes required to represent the content data; and
generate phoneme time references for each of the phonemes, the phoneme time reference indicating the time at which the respective phoneme should be presented with respect to the time base.

7. Apparatus according to claim 6, wherein the linguistic processor is further adapted to:
parse the presentation data;
generate a number of tags representing the presentation data; and,
generate tag time references for each of the tags, the tag time reference indicating the time at which the respective tag should modify the manner of presentation with respect to the time base.

8. Apparatus according to claim 6, wherein the linguistic processor is coupled to the store to obtain an indication of the phonemes required to represent respective words.

9. Apparatus according to claim 6, wherein the text-to-speech processor includes a concatenation processor adapted to:
determine phoneme data representing each of the phonemes; and,
concatenate the phoneme data in accordance with the phoneme time references to generate audio data representing the speech.

10. Apparatus according to claim 9, wherein the concatenation processor is coupled to the store to obtain the phoneme data therefrom in accordance with the determined phonemes.

11. Apparatus according to claim 6, wherein the animation processor includes a phoneme processor adapted to:
obtain the determined phonemes, and the associated phoneme time references, from the linguistic processor;
determine visemes corresponding to each of the determined phonemes; and,
determine a viseme time reference for each viseme in accordance with the phoneme time reference of the corresponding phoneme.

12. Apparatus according to claim 11, wherein the phoneme processor is coupled to the store to obtain translation data therefrom, the translation data indicating a viseme associated with each of the phonemes, the phoneme processor using the translation data to determine the visemes in accordance with the determined phonemes.

13. Apparatus according to claim 12, wherein the animation processor includes a viseme processor coupled to the store, the viseme processor being adapted to obtain viseme data from the store in accordance with the determined visemes, the viseme data including a number of parameters representing the variation required from a base character image to represent the respective viseme.

14. Apparatus according to claim 13, wherein the animation processor includes at least one modification processor adapted to modify the viseme data in accordance with the presentation data.

15. Apparatus according to claim 14, wherein the or each modification processor is coupled to the store to obtain modification data therefrom, the or each modification processor using the modification data to modify the parameters of the viseme data.

16. Apparatus according to claim 14, wherein the or each modification processor is adapted to modify at least one of a specified expression, behaviour, and action.

17. Apparatus according to claim 14, wherein the or each modification processor is further adapted to modify the viseme data in accordance with pseudo-random data.

18. Apparatus according to claim 13, wherein the animation processor further comprises an interpolation processor for interpolating the viseme data to determine the appearance of the character at times between the specified visemes.

19. Apparatus according to claim 18, wherein the processing system further comprises a render processor coupled to the interpolation processor for generating image data in accordance with the interpolated viseme data, the image data representing the character presenting the speech defined by the content data.

20. Apparatus according to claim 19, wherein the processing system further includes an video processor, the render processor forming part of the video processor.

21. Apparatus according to claim 20, wherein the video processor generates video data representing the animated character sequence.

22. Apparatus according to claim 1, wherein the processing system further comprises a communications network interface, which in use couples the computing device to a communications network, thereby allowing the animated character representation to be transferred to other processing systems coupled to the communications network.

23. Apparatus according to claim 22, wherein in use the input is adapted to receive marked-up data from the communications network.

24. Image and/or audio data generated using apparatus according to claim 1.

25. A method of generating an animated character representation using a processing system, the method comprising:
receiving marked-up input data including:
content data representing speech to be presented; and,
presentation data representing the manner in which the speech is presented;
generating data according to a defined time-base, the data including:
phoneme data generated in accordance with the content data; and,
viseme data generated in accordance with the phoneme data and the presentation data;
generating audio data in accordance with the phoneme data;
generating image data in accordance with the viseme data and the presentation data; and,
synchronising the output of the audio and image data in accordance with the defined time-base.

26. A method according to claim 25, wherein the method further comprises:
i. generating first viseme data in accordance with the phoneme data; and,
ii. generating second viseme data in accordance with the first viseme data modified by presentation data;
wherein the image data is generated in accordance with the second viseme data.

27. A method according to claim 25, wherein the method further comprises:
parsing the received marked-up data;
detecting predetermined content data which is to be presented in a predetermined manner;
generating presentation data representative of the predetermined manner; and,
modifying the received marked-up data with the generated presentation data.

28. A method according to claim 27, wherein the predetermined content data includes words which are names, nouns, negatives and numbers.

29. A method according to claim 8, wherein the method of generating the phoneme data further comprises:

using each of the determined phonemes to obtain respective phoneme data; and, concatenating the phoneme data in accordance with the phoneme time references to generate audio data representing the speech.

30. A method according to claim 28, wherein the method of generating the viseme data comprises:

determining visemes corresponding to each of the determined phonemes; and, determining a viseme time reference for each viseme in accordance with the phoneme time reference of the corresponding phoneme; and, using the viseme to obtain the viseme data.

31. A method according to claim 30, wherein the visemes are determining by accessing translation data in accordance with the determined phonemes, the translation data indicating a viseme corresponding to each phoneme.

32. A method according to claim 30, wherein the viseme data includes a number of parameters representing the variation required from a base character image to represent the respective viseme.

33. A method according to claim 30, wherein the method further comprises modifying the viseme data by modifying the parameters in accordance with the presentation data, the viseme data being modified to represent at least one of a specified expression, behaviour, and action.

34. A method according to claim 30, wherein the viseme data is further modified in accordance with pseudo-random behaviour.

35. A method according to claim 30, wherein the method further comprises interpolating the viseme data to determine the appearance of the character at times between the specified visemes.

36. A method according to claim 35, wherein the method further comprises using the interpolated viseme data to generate image data representing the character presenting the speech defined by the content data.

37. A method according to claim 25, wherein the method of generating the phoneme data comprises:

parsing the content data;

determining the phonemes required to represent the content data; and, generating phoneme time references for each of the phonemes, the phoneme time reference indicating the time at which the phoneme should be presented with respect to the time base.

38. A method according to claims 37, wherein the method further comprises:

parsing the presentation data;

generating a number of tags representing the presentation data; and, generating tag time references for each of the tags, the tag time reference indicating the time at which the respective tag should modify the manner of presentation with respect to the time base.

39. A method according to claim 37, wherein the method of determining the phonemes comprises using the parsed content data to access a dictionary, the dictionary indicating the phonemes required to represent respective words.

40. A method according to claim 37, wherein the method further comprises modifying the phoneme data in accordance with the presentation data.

41. Image data and/or audio data generated in accordance with the method of claim 25.

* * * * *